Patented July 23, 1940

2,209,244

UNITED STATES PATENT OFFICE 2,209,244

MANUFACTURE OF ANTINEURITICALLY ACTIVE PRODUCTS

Hans Andersag and Kurt Westphal, Wuppertal-Elberfeld, Germany, assignors to Winthrop Chemical Company, Inc., New York, N. Y., a corporation of New York No Drawing. Application December 9, 1938, Serial No. 244,786. In Germany January 28, 1936

11 Claims. (Cl. 260—251)

This invention relates to the manufacture of quaternary thiazolium compounds the quaternary nitrogen atom of which is connected by means of an aliphatic chain with a pyrimidine nucleus; it further relates to certain products obtainable by the said manufacture.

It is the object of the present invention to produce by chemical synthesis compounds having an anti-neuritic activity. A particular object is the synthesis of the anti-neuritic vitamin $B_1$ which has also been called "Aneurin."

Several investigators who have been concerned with scientific research work on the chemical nature of vitamin $B_1$ and of certain cleavage products obtained by splitting off vitamin $B_1$ have suggested that vitamin $B_1$ contains a quaternary thiazole ring which is substituted in the 4-position by a methyl group and in the 5-position by a hydroxyethyl group and the quaternary nitrogen atom of which is directly connected with a nuclear carbon atom of a pyrimidine ring which on its part is substituted by an amino and alkyl group. Certain investigators think that the most probable formula of vitamin $B_1$ is the following one:

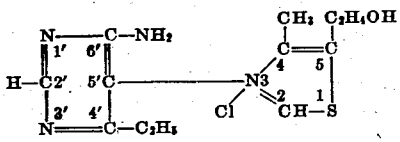

Other investigators have suggested that two methyl groups are attached to the pyrimidine ring in 2'- and 4'-position instead of the ethyl group standing in the above formula in the 4'-position of the pyrimidine ring. In view of their experimental results all investigators agree that a nuclear carbon atom of the pyrimidine nucleus is directly linked to the quaternary nitrogen atom of the thiazolium radical.

On account of our own experimental investigations regarding the nature of the natural vitamin $B_1$ we have formed another idea of the chemical structure of vitamin $B_1$. According to our idea in vitamin $B_1$ the pyrimidine radical is not directly linked by a nuclear carbon atom to the quaternary nitrogen atom of the thiazolium radical but is connected with the said quaternary nitrogen atom by means of an aliphatic bridge, in particular a methylene group. Indeed, we have succeeded in the synthesis of products having an antineuritic activity by the synthetic manufacture of thiazolium compounds having attached to the quaternary nitrogen atom by means of an aliphatic chain an amino pyrimidine radical, the aliphatic chain and the amino group being preferably attached to the 5- and 4-positions of the pyrimidine nucleus respectively. In particular we have found that by the synthesis of N-(2'-methyl-4'-amino-pyrimidyl-5'-methyl)-4-methyl-5-hydroxyethyl-thiazolium chloride of the following formula:

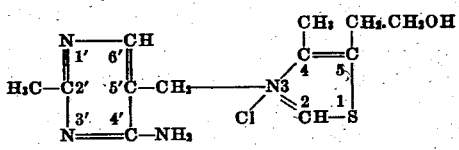

or its tautomeric formula:

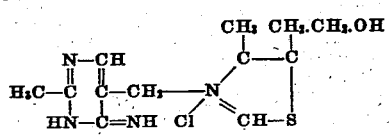

a product is obtained which proves to be identical with the natural vitamin $B_1$. The synthetic product forms the same crystals as the natural vitamin $B_1$; the said crystals have the same physical properties, for instance, same color, same solubility, same melting point and yield when mixed with crystals of the natural vitamin $B_1$ no decrease in the melting temperature. Furthermore, the new synthetic product shows the same chemical behaviour as the natural vitamin $B_1$ and most important of all is that it has the same antineutritic activity as the natural vitamin.

It has further been found that modifications of the vitamin $B_1$ are possible without depriving the modified products of the antineuritic activity. In particular the methyl groups in the 4-position of the thiazole part and in the 2'-position of the pyrimidine part may be replaced by other alkyl groups, such as the ethyl and propyl group. Even aryl groups, such as the phenyl group may stand instead of the said methyl groups. Likewise the methylene group forming the aliphatic bridge between the quaternary nitrogen atom of the thiazole part and the nuclear carbon atom of the pyrimidine part may be replaced by other aliphatic chains, for instance, the ethylene group. Also the hydroxyethyl radical standing in 5-position of the thiazole radical may be replaced by other hydroxyalkyl groups but it appears that this modification more than the other changes referred to above causes a considerable decrease of the antineuritic activity. The said hydroxyalkyl groups, particularly the hydroxyethyl group, may be esterified, for instance, by acetic acid and benzoic acid. Instead of the free amino group in the 4'-position a substituted amino group, for instance, an alkylated amino group may be present.

It results that by the present invention the vitamin $B_1$ which until now was obtained only from natural sources in a very cumbersome manner may be prepared by chemical synthesis according to the methods hereinafter described.

By the present invention it has further been established that also synthetic products which have a different but similar chemical constitution as compared with the chemical constitution of vitamin $B_1$ are distinguished by a more or less important antineuritic activity.

In accordance with the present invention the N - (aminopyrimidylalkyl) - thiazolium compounds can be prepared by starting with 4-aminopyrimidines which contain attached to the 5-carbon atom a thioformylamidoalkyl-radical. In these compounds the thiazolium radical is built up with the aid of the said thioformylamidoalkyl group by reacting thereupon with an aliphatic alpha-halogen ketone which is substituted at the halogenated carbon atom by a lower hydroxyalkyl group of at least two carbon atoms. The reaction proceeds, for instance, when using 2-alkyl-4-aminopyrimidine substituted in the 5-position by a thioformamidoalkyl group and 2-keto-3-halogen-pentanol-5, in accordance with the following reaction scheme:

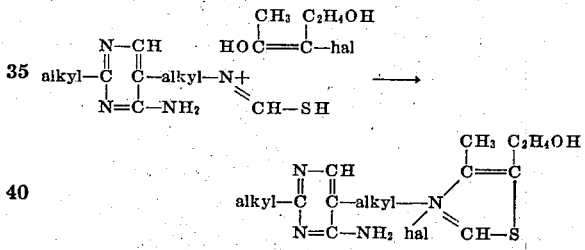

It may be mentioned that such 2-keto-pentanol compounds are tautomeric with their cyclic semi acetal form, for instance, 2-keto-pentanol-5 is tautomeric with 2-methyl-2-hydroxytetrahydrofurane (Meyer-Jacobson, Lehrbuch der organischen Chemie, (2nd edition; 1923), page 901). Instead of the hydroxy-alkyl-halogen-ketones their esters, for instance with acetic and benzoic acid may be employed in this reaction. If desired, the acid radical may be subsequently split off by saponification, for instance, by treatment with dilute mineral acid. The condensation is advantageously accelerated by heating.

The pyrimidine starting components may be obtained by the processes described in our application for Letters Patent Ser. No. 244,787, filed December 9, 1938. According to these processes the 2-alkyl - 4 - amino-5-thioformylamidoalkyl-pyrimidines are obtained by reacting upon 2-alkyl-4-amino - 5 - aminoalkyl-pyrimidines with formic acid ester and transforming the 2-alkyl-4-amino - 5 - formylamidoalkyl-pyrimidines into the corresponding thioformyl compounds by treatment with phosphorus pentasulfide. The 2-alkyl-4-amino-5-thioformylamidoalkyl - pyrimidines may also be prepared in accordance with the process described in Example 9 of French Patent 822,533. The same process is described in Example 8 of British Patent 478,993. The 2-alkyl-4-amino-5-aminoalkyl-pyrimidines are obtained in accordance with the processes described in our copending application Ser. No. 118,261, filed Dec. 30, 1936, for instance, by condensing an α-hydroxymethylene-succinic ester with acetamidine, treating the 2-methyl-4-hydroxy-pyrimidine-5-acetic ester with phosphorus oxychloride, reacting upon the 4-chloro compounds formed with ammonia and converting the 2-methyl-4-amino-pyrimidine-5-acetamide thus obtained according to Hoffmann's reaction into the 2-methyl-4-amino-5-aminomethyl-pyrimidine.

The invention is further illustrated by the following examples without being restricted thereto:

*Example 1.*—2 grams of N-(2-methyl-4-aminopyrimidyl-5-methyl)-thioformamide and 3 grams of gamma-bromo - gamma - acetopropylbenzoate (obtained by bromination of gamma-acetopropyl-benzoate) are heated for half an hour on the boiling water bath. The melt is boiled for several hours under reflux with 50 ccs. of 18% methyl-alcoholic hydrochloric acid, the methyl alcohol is evaporated and the residue taken up in water. The mixture is extracted with ether for removing neutral constituents and a 10% sodium carbonate solution is added to the aqueous solution until the reaction is rendered alkaline. The precipitate separating is removed. The filtrate is repeatedly extracted with ether, acidified with hydrochloric acid and treated with picrolonic acid solution. Thereby the picrolonate precipitates in crystals. The solution is filtered with suction, washed with water, digested with 10% aqueous hydrobromic acid and the picrolonic acid is repeatedly extracted with ether. The hydrobromic acid solution is evaporated to dryness with reduced pressure. The residue is recrystallized from alcohol. In this manner colorless crystals (melting at 220° C.) of the hydrobromide of N-(2'-methyl-4'-aminopyrimidyl - 5' - methyl) - 4 - methyl-5-hydroxy-ethyl-thiazolium-bromide are obtained.

When using instead of gamma-bromo-gamma-acetopropylbenzoate less gamma-bromo-gamma-aceto-propyl-alcohol, the heat-treatment with the methyl alcoholic hydrochloric acid may be avoided; finally, the same product is obtained as described before.

When using for splitting off of the picrolonate instead of hydrobromic acid 10% hydrochloric acid and working as described before, the corresponding hydrochloride melting at 247-248° C. is obtained.

The same compound is obtained by suspending 1.8 grs. of N-(2-methyl-4-amino-pyrimidyl-(5)-methyl)-thioformamide in 30 ccs. of alcohol, reacting with the solution of 0.23 gr. of sodium in 5 ccs. of alcohol, digesting with 1.5 grs. of gamma-chloro-gamma-aceto-propyl-alcohol for 5 hours at 40° C., filtering off from the sodium chloride separating and evaporating to dryness with 2 ccs. of concentrated hydrochloric acid under reduced pressure and working up in the manner described above.

*Example 2.*—3.6 grs. of N-(2-methyl-4-amino-pyrimidyl-(5)-methyl)-thioformamide are heated in a boiling waterbath with 3.9 grs. of 2-keto-3-bromo-6-hydroxyhexane (compare "Annalen der Chemie" 423, p. 341) during one hour. The melt is thereafter treated with dilute alcohol, hydrobromic acid is added to the mixture until the reaction is acid to Congo-red; the mixture is then evaporated to dryness under diminished pressure and the residue repeatedly recrystallized fom dilute alcohol. The N-(2'-methyl-4'-amino-pyrimidyl-(5')-methyl)-4 - methyl - 5 - gamma-hydroxypropyl - thiazoliumbromide - hydrobromide thus obtained forms colorless crystals melting at 226° C.

*Example 3.*—2 grs. of N-(2-ethyl-4-aminopyrimidyl-(5)-methyl)-thioformamide and 1.5 grs. of gamma-chloro-gamma-acetopropylalcohol are heated on the waterbath during half an hour. Thereafter the melt is treated with alcoholic hydrogen-chloride. The product which has separated is recrystallized from aqueous alcohol. The colorless crystals obtained melt at 243° C. and represent the N-(2'-ethyl-4'-amino-pyrimidyl-(5')-methyl)-4-methyl-5-hydroxyethyl-thiazoliumchloride-hydrochloride. Its picrate melts at 194–195° C.

*Example 4.*—2 grs. of N-(2-ethyl-4-amino-pyrimidyl-(5)-methyl)-thioformamide are heated on the boiling waterbath with 3 grs. of gamma-chloro-gamma-aceto-propylalcohol-acetate during half an hour. Thereafter the melt is boiled with 50 ccs. of 20% methylalcoholic hydrochloric acid during several hours, the methylalcohol is then evaporated and the residue treated with water. Neutral components are extracted from the mixture with ether. 10% sodium carbonate solution is added to the aqueous solution until the reaction of the mixture is alkaline. The precipitate formed is filtered off and the filtrate repeatedly extracted with ether, then acidified with hydrochloric acid, picrolonic acid solution is added, whereupon the picrolonate separates. It is filtered with suction and recrystallized from water, then treated with 10% hydrochloric acid and the mixture repeatedly extracted with ether to remove the picrolonic acid. The hydrochloric acid solution is evaporated to dryness under diminished pressure. The residue is recrystallized from aqueous alcohol. The colorless crystals of the N-(2'-ethyl-4'-amino-pyrimidyl-(5')-methyl)-4-methyl-5-hydroxyethyl-thiazoliumchloride-hydrochloride thus obtained melt at 243° C.

This is a "continuation in part" application of our copending application Ser. No. 118,260, filed December 30, 1936.

We claim:

1. The process which comprises reacting upon a 4-amino-5-thioformylamidomethyl-pyrimidine which is substituted in the 2-position by a substituent of the group consisting of hydrogen and lower alkyl with an aliphatic halogenated keto-alkanol-compound of the group consisting of aliphatic α-halogen-ketones which are substituted at the halogenated carbon atom by a lower hydroxy alkyl group of at least two carbon atoms, their tautomers and ester derivatives while heating.

2. The process which comprises reacting upon 2-methyl-4-amino-5-thioformylamidomethyl-pyrimidine with an aliphatic halogenated keto-alkanol-compound of the group consisting of aliphatic α-halogen-ketones which are substituted at the halogenated carbon atom by a lower hydroxy alkyl group of at least two carbon atoms, their tautomers and ester derivatives, while heating.

3. The process which comprises reacting upon 2-ethyl-4-amino-5-thioformylamidomethyl-pyrimidine with an aliphatic halogenated keto-alkanol-compound of the groups consisting of aliphatic α-halogen-ketones which are substituted at the halogenated carbon atom by a lower hydroxy alkyl group of at least two carbon atoms, their tautomers and ester derivatives, while heating.

4. The process which comprises reacting upon a 4-amino-5-thioformylamidomethyl-pyrimidine which is substituted in the 2-position by a substituent of the group consisting of hydrogen and lower alkyl with 2-keto-3-halogen-pentanol-(5) while heating.

5. The process which comprises reacting upon 2-methyl-4-amino-5-thioformylamidomethyl-pyrimidine with 2-keto-3-halogen-pentanol-(5) while heating.

6. The process which comprises reacting upon a 4-amino-5-thioformylamidomethyl-pyrimidine which is substituted in the 2-position by a substituent of the group consisting of hydrogen and lower alkyl with an ester of 2-keto-3-halogen-pentanol-(5).

7. The process which comprises reacting upon 2-methyl-4-amino-5-thioformylamidomethyl-pyrimidine with an ester of 2-keto-3-halogen-pentanol-(5).

8. The process which comprises reacting upon a 2-ethyl-4-amino-5-thioformylamidomethyl-pyrimidine with an ester of 2-keto-3-halogen-pentanol-(5).

9. The process which comprises reacting upon 2-methyl-4-amino-5-thioformylamidomethyl-pyrimidine with 2-keto-3-halogen-pentanol-(5)-acetate.

10. The process which comprises reacting upon 2-methyl-4-amino-5-thioformylamidomethyl-pyrimidine with 2-keto-3-bromo-pentanol-(5) while heating.

11. The process which comprises reacting upon 2-ethyl-4-amino-5-thioformylamidomethyl-pyrimidine with 2-keto-3-halogen-pentanol-(5)-acetate.

HANS ANDERSAG.
KURT WESTPHAL.